(12) United States Patent
Chen

(10) Patent No.: US 7,337,793 B2
(45) Date of Patent: Mar. 4, 2008

(54) SUN SHADE APPARATUS FOR A VEHICLE

(76) Inventor: Chih Guang Chen, 202-12101-80th Avenue, Surrey, British Columbia (CA) V3W 5V6

( * ) Notice: Subject to any disclaimer, the term of this patent is extended or adjusted under 35 U.S.C. 154(b) by 436 days.

(21) Appl. No.: 11/063,250

(22) Filed: Feb. 23, 2005

(65) Prior Publication Data

US 2005/0211286 A1  Sep. 29, 2005

(51) Int. Cl.
*E04H 15/06* (2006.01)
*E60J 11/00* (2006.01)
(52) U.S. Cl. .............. 135/88.07; 135/88.08; 135/117; 296/136.11; 160/370.21; 155/166
(58) Field of Classification Search .. 135/88.07–88.09, 135/88.13–88.16, 88.01, 116, 117; 296/95.1, 296/98, 135, 136.03, 136.11–136.13, 97.7, 296/136.1; 160/370.21–370.22, 23.1; 150/166
See application file for complete search history.

(56) References Cited

U.S. PATENT DOCUMENTS

| | | | |
|---|---|---|---|
| 3,476,032 A * | 11/1969 | Mattly | 296/210 |
| 3,763,908 A * | 10/1973 | Norman | 150/166 |
| 3,785,697 A | 1/1974 | Dabbs | |
| 3,992,053 A | 11/1976 | Hrytzak et al. | |
| 4,432,581 A * | 2/1984 | Guma | 296/136.03 |
| 4,684,165 A * | 8/1987 | Becker | 296/136.12 |
| 4,825,889 A | 5/1989 | Monteith | |
| 4,842,324 A | 6/1989 | Carden | |
| 4,858,985 A * | 8/1989 | Wojcik | 296/136.03 |
| 4,925,234 A | 5/1990 | Park et al. | |
| 4,958,881 A | 9/1990 | Piros | |
| 4,966,406 A | 10/1990 | Karasik et al. | |
| 5,022,700 A * | 6/1991 | Fasiska et al. | 296/98 |
| 5,029,933 A | 7/1991 | Gillem | |
| 5,078,446 A | 1/1992 | Walter | |
| 5,242,206 A * | 9/1993 | Heck | 296/136.02 |
| 5,378,035 A * | 1/1995 | Wu | 296/136.03 |
| 5,409,286 A | 4/1995 | Huang | |
| 5,490,707 A | 2/1996 | De La Cruz | |
| 5,503,212 A | 4/1996 | Lin | |
| 5,567,002 A | 10/1996 | Tair | |
| 5,597,196 A | 1/1997 | Gibbs | |
| 5,597,197 A | 1/1997 | Mowar et al. | |
| 5,762,393 A | 6/1998 | Darmas, Sr. | |
| 5,855,406 A | 1/1999 | Vargo | |
| 6,131,643 A | 10/2000 | Cheng et al. | |

(Continued)

FOREIGN PATENT DOCUMENTS

FR  2585299  1/1987

(Continued)

*Primary Examiner*—Winnie Yip
(74) *Attorney, Agent, or Firm*—Lance A. Turlock

(57) ABSTRACT

Sun shade apparatus for a vehicle includes a canopy housing and an elongated canopy which is retractable into the housing and extendable from the housing over the roof of a vehicle. Support stands positionable on the vehicle roof serve to engage the canopy while holding it away from the roof when the canopy is extended over the roof. Each of the support stands includes a canopy hook for releasably engaging the canopy. The hooks may be made moveable between an unlatched position facilitating engagement and disengagement with the canopy and a latched position securing the canopy.

7 Claims, 3 Drawing Sheets

U.S. PATENT DOCUMENTS

| | | | |
|---|---|---|---|
| 6,250,320 B1 * | 6/2001 | Roth | 135/87 |
| 6,427,709 B1 | 8/2002 | Montes | |
| 6,513,858 B1 | 2/2003 | Li et al. | |
| 6,682,123 B2 | 1/2004 | Burks et al. | |
| 6,705,664 B1 * | 3/2004 | Lahutsky | 296/136.12 |

FOREIGN PATENT DOCUMENTS

| | | |
|---|---|---|
| FR | 2586380 | 2/1987 |
| FR | 2705065 | 11/1994 |
| FR | 2706374 | 12/1994 |
| GB | 1449321 | 9/1976 |
| GB | 1522367 | 8/1978 |
| GR | 1002700 | 5/1997 |
| JP | 63097421 A * | 4/1988 |
| JP | 2000264074 A * | 9/2000 |
| JP | 2003-211976 (PAJ) | 7/2003 |
| WO | WO-9800304 | 1/1998 |

\* cited by examiner

SUN SHADE APPARATUS FOR A VEHICLE

FIELD OF THE INVENTION

The present invention relates to sun shade apparatus for a vehicle, the purpose being to reduce the build up of interior temperatures when the vehicle is allowed to stand in the hot sun.

BACKGROUND TO THE INVENTION

It is common practice in apparatus for blocking the sun after a vehicle is parked to use a reflector or other cover to shield the vehicle from the sun from inside of the vehicle. But, this does not stop the sun from heating up the interior of the vehicle by beating down on the vehicle roof. As a result, a number of vehicle sun shades or canopies have been devised to extend over the vehicle roof and thereby provide additional heat insulation. Some of these canopies include a desirable insular air space between the shade and the vehicle roof. However, they are not well adapted for compact storage when not in use, and they are not well adapted to both hold a canopy in an extended working position while permitting retraction into a storage position.

For the foregoing reasons, there is a need for new and improved sun shade apparatus which serves to reduce the build up of temperature within a vehicle when parked, and which serves to minimize storage issues when not parked.

SUMMARY OF THE INVENTION

In a broad aspect of the present invention, there is provided sun shade apparatus for a vehicle, the vehicle comprising a vehicle body with a roof, front and rear roll down windows on opposed sides of the vehicle, a storage trunk, and a trunk latch for holding the trunk in a closed position. The apparatus includes a canopy housing, an elongated sun shade canopy retractable into the housing and extendable from the housing over the roof, and a plurality of support stands positionable on the roof for holding the canopy away from the roof when the canopy is extended over the roof. Each of the support stands includes a canopy hook for releasably engaging the canopy. Preferably, the hooks are moveable from an unlatched position facilitating engagement and disengagement with the canopy and a latched position securing the canopy. As well, the canopy is preferably automatically retractable under spring tension as, for example, with a window blind. However, it is to be understood that the manner of such retraction forms no part of the essence of the present invention. Retraction may be automatic as is preferred (e.g. using known spring loaded mechanisms such as with window blinds), but it may also be manual as with a hand crank.

In preferred embodiments, the apparatus comprises four support stands positionable on the roof of the vehicle as a forward pair of stands and a rearward pair of stands. The pairs are strappable to the roof in respective positions, each pair by an associated strap extending through the associated supports between opposed sides of the vehicle. Further, the canopy includes a first plurality of openings spaced along a first side region of the canopy and a second plurality of openings spaced along a second side region of the canopy. Each of the canopy hooks is engageable with one of the openings.

The straps themselves may be secured to the vehicle in various ways. For example, if the vehicle includes window gutters, then the straps may be hooked to those gutters. However, not all vehicles include window gutters. In order to provide adaptability for a range of vehicles, the straps preferably have opposed ends which are releasably couplable with each other and a length which is sufficient to form a continuous loop which extends above the vehicle roof between opposed sides of the vehicle then below the roof through window openings resulting when the vehicle windows are rolled down. It will be readily apparent that with a strap of such length, a continuous loop may be formed either by running the strap through open windows of the vehicle and below the vehicle roof or by running the strap through open doors of the vehicle and below the vehicle roof, the latter distance normally being somewhat shorter than the former. While it may be considered preferable to run a strap through open doors of the vehicle, this obviously may not be a viable option is some cases (e.g. if the vehicle is a two door sedan). Suitable coupling may be achieved with the use of a conventional adjustable buckle or with means such as conventional cooperating VELCRO® material at the opposed ends of each strap.

Also in preferred embodiments, the canopy housing is mountable within the trunk of the vehicle (whether that trunk is a forward trunk or a rearward trunk). The canopy includes an opening permitting passage of the trunk latch through the canopy when the trunk is closed and the canopy is extended outwardly from the trunk and over the roof. As well, a plurality of elastic ropes are provided, each extending from a forward end of the canopy to an associated body hook engageable with the body of the vehicle.

In preferred embodiments, each of the support stands further comprises a stand housing comprising a housing base, a containment wall, and a cap together defining a containment region. The canopy hook associated with each stand includes a stem extending upwardly from the containment region from a base of the hook through an opening in the cap. At least one flange extends outwardly from the stem. A spring is contained within the housing, the base of the hook being carried by an upper end of the spring. The hook is moveable upwardly and downwardly between:

an upper position where both the stem of the hook and the flange extend upwardly through the opening in the cap, and where rotation of the hook relative to the support stand is restrained by engagement between the flange and the cap; and, a lower position where the flange is fully contained within the containment region, the hook then being rotatable relative to the stand to an angular position where upward movement of the hook is restrained by engagement between the flange and the cap.

The foregoing and other features of the invention will now be described in more detail with reference to the accompanying drawings.

DETAILED DESCRIPTION

Figure 1:
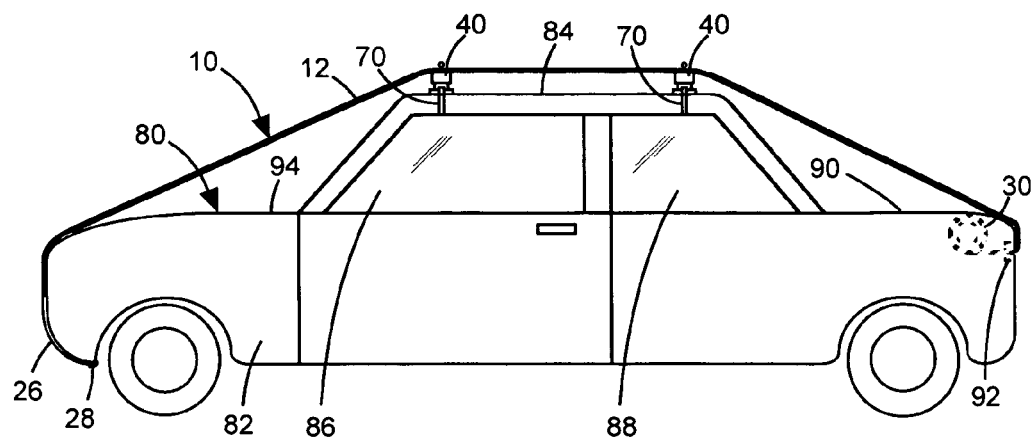
FIG. 1 is a side view of a vehicle shielded by sun shade apparatus in accordance with the present invention.

In the figures, sun shade apparatus in accordance with the present invention is generally designated 10 and, in FIG. 1, is shown when in use to provide shading for a vehicle generally designated 80. Apparatus 10 comprises an elongated sun shade canopy 12 retractable within a canopy housing 30, four elastic ropes 26 with proximal ends secured to the forward end 13 of canopy 12, four support stands 40, and a pair of straps 70. Body hooks 28 are secured to the distal ends of elastic ropes 26. Vehicle 80 (which does not form part of the invention) comprises a vehicle body 82 with a roof 84, front and rear roll down windows 86, 88 on opposed sides of the vehicle, a storage trunk 90 shown in a closed position, and a trunk latch 92 for holding the trunk in a closed position. As well, vehicle 80 comprises a hood 94 and front and rear windows 96, 98.

Figure 3:
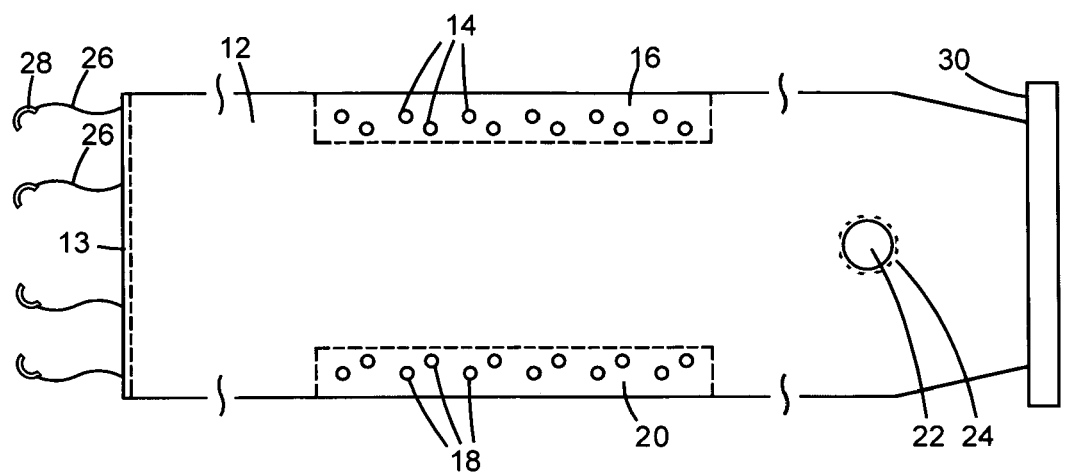
FIG. 3 is a top view of a shade canopy and housing forming part of the apparatus shown in FIG. 1.
Figure 4:
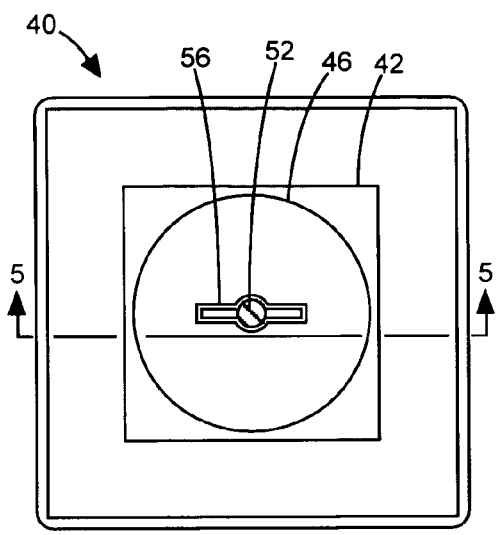
FIG. 4 is a top view of one of the support stands shown in FIG. 1 when sectioned along section line 4-4 in FIG. 5.

Canopy 12 comprises fabric material and is preferably white or coated with silver paint on the side normally exposed to sunlight. It includes a first plurality of openings 14 spaced along side region 16 of the canopy and a second plurality of openings 18 spaced along side region 20 of the canopy. The openings 14, 18 permit the canopy to be engaged by canopy hooks as discussed below. To lessen the chance of damage from such engagement, regions 16, 20 are formed from a stitched double layer of fabric (stitching being indicated by broken lines in FIG. 3.

Canopy 12 also includes an opening 22 centrally disposed widthwise of the canopy. As discussed below, opening 22 permits passage of a trunk latch. The region 24 around the perimeter of opening 22 is formed with a stitched double layer of fabric to provide reinforcement. The region 15 along forward end 13 of canopy 12 is also formed with a stitched double layer of fabric to provide reinforcement where ropes 26 are secured.

A support stand 40 is shown in more detail in FIGS. 4 to 7. As can be seen, stand 40 includes a stand housing comprising a housing base 42, a cylindrical containment wall 44 formed integrally with base 42, and a cap 46 threadingly engaged with wall 44. Base 42 includes an opening 43 through which a strap 50 may extend and is carried on a protective pad 45 (e.g. rubber). Together, base 42, wall 44 and cap 46 form a containment region 48. A canopy hook 50 having a stem 52 extends upwardly from a hook base 54 through a keyhole slot or opening 56 in cap 46 for hooking canopy 12 through a selected one of either holes 14 or 18. Also, a pair of fins or flanges 58 extend outwardly from stem 52. A spring 60 contained within housing carries hook base 54 at its upper end.

Figure 6:
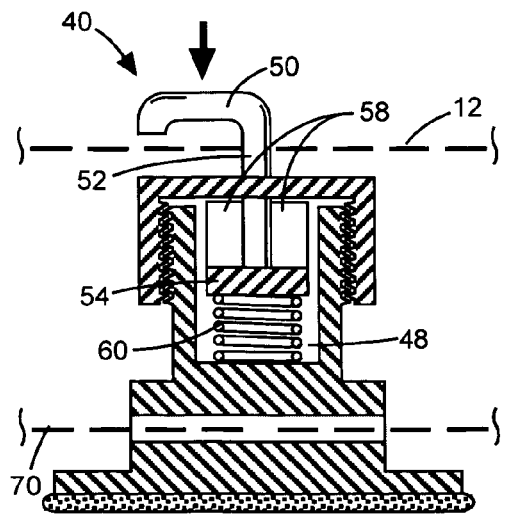
FIG. 6 is a section elevation view as in FIG. 5, but with the hook forming part of the stand pushed to a depressed a position.
Figure 5:
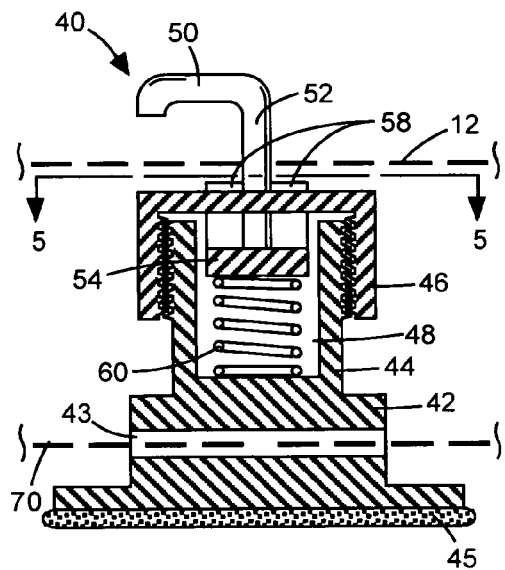
FIG. 5 is a section elevation view of the support stand shown in FIG. 4, when sectioned along section line 5-5 in FIG. 4.
Figure 7:
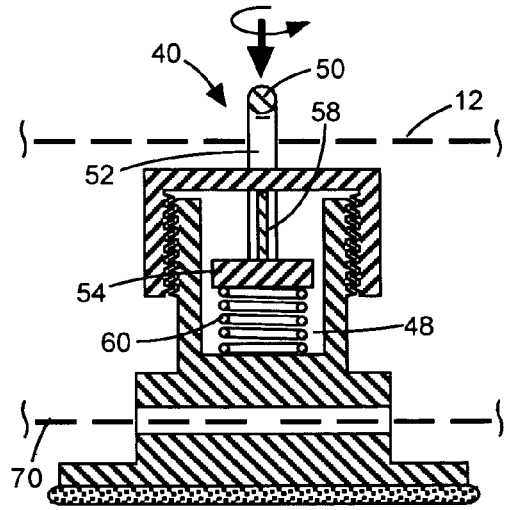
FIG. 7 is a section elevation as in FIG. 6, but with the hook rotated 90 degrees from the position shown in FIG. 6.

With reference to FIGS. 5 to 7 it will be seen that hook 50 is moveable from an unlatched upper position (FIG. 6) where stem 52 and flanges 58 extend upwardly through opening 56 in cap 46 to a lower position (FIGS. 7, 8) where flanges 58 are fully contained within containment region 48. In the upper position, rotation of hook 50 relative to stand 40 is restrained by engagement between flanges 58 and 46, in particular, the perimeter side wall of opening 56 in cap 46. When hook 50 is pushed down to the lower position, flanges 58 are clear of opening 56 and the hook is then rotatable to a 90 degree angular or latched position as shown in FIG. 7 where upward movement of the hook is restrained by engagement between flanges 58 and cap 36, in particular by engagement between the upper edges of flanges 58 and the underside of cap 36.

Figure 2:
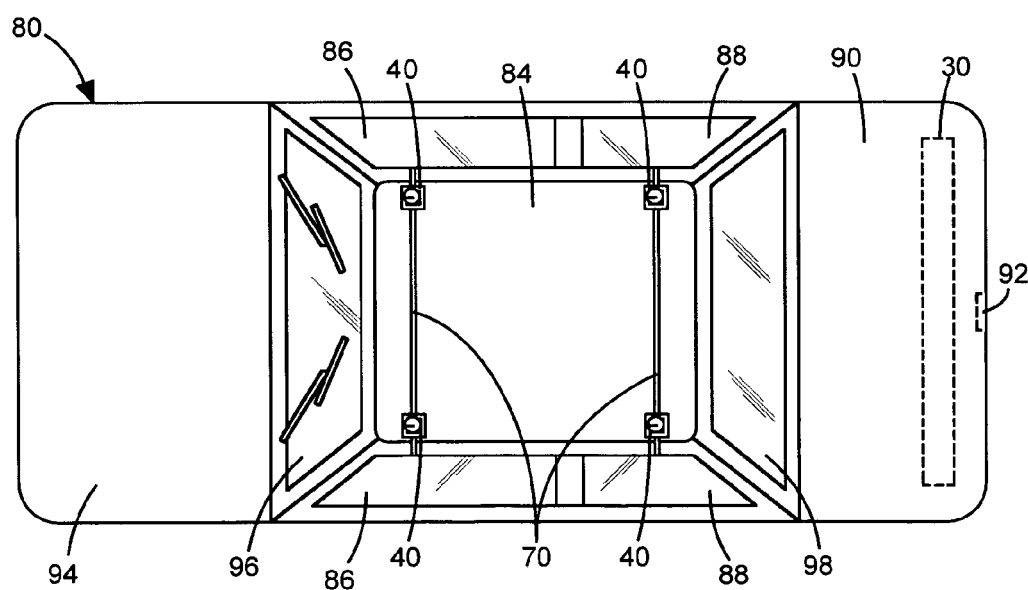
FIG. 2 is a top view of the vehicle and part of the apparatus shown in FIG. 1.

The use of the invention will now be described for the case of vehicle 80. Canopy housing 30 with canopy 12 retracted therein is located in trunk 90. When it is desired to shade the vehicle from the sun, support stands 40 are first positioned atop roof 84 as shown in FIGS. 1 and 2 where they are then secured by straps 70. More particularly, with the two front doors of the vehicle open, one strap 70 may be formed into a continuous loop extending through base 42 of the forward pair of stands 40, through the open doors, and below roof 84. Similarly, with the two rear windows 88 of the vehicle rolled down, the other strap 70 may be formed into a continuous loop extending through base 42 of the rearward pair of stands 40, through the open rear windows 88, and below roof 84. Each loop is joined by suitable coupling as described above. Then, the windows 88 may be rolled up and the front doors of the vehicle may be closed. If vehicle 80 included rear doors, then the strap 70 extending through base 42 of the rearward pair of support stands 40 could as a matter of choice be looped through the rear doors when open rather than through the rear windows 88 when rolled down.

Then, trunk 90 is opened and canopy 12 is pulled from housing 12 until opening 22 in the canopy aligns with trunk latch 92. Trunk 90 is then closed, thereby clamping canopy 12 while latching through opening 22. The canopy is then extended over vehicle 90 to the position shown in FIG. 1 where body hooks 28 engage the front end of vehicle body 82.

At each of the four support stands 40 the closest canopy opening 14 or 18, as the case may be, is then located. Canopy hooks 50 are then hooked through the openings while in the position shown in FIG. 5. Then, the canopy hooks are pushed downwardly to the position shown in FIG. 6 and rotated to the position shown in FIG. 7, thereby securing canopy 12.

Preferably the support stands are sized such that canopy 12 is secured at a distance about 4 inches above roof 84. This allows air to flow freely beneath the canopy and reduces the degree of heating within vehicle 80 while windows 86, 88 are rolled up.

A variety of modifications, changes and variations to the invention are possible within the spirit and scope of the following claims, and will undoubtedly occur to those skilled in the art. The invention should not be considered as restricted to the specific embodiments that have been described and illustrated with reference to the drawings.

I claim:

1. Sun shade apparatus for a vehicle, said vehicle comprising a vehicle body with a roof, front and rear roll down windows on opposed sides of the vehicle, a storage trunk, and a trunk latch for holding said trunk in a closed position, said apparatus comprising:
    (a) a canopy housing;
    (b) an elongated sun shade canopy retractable within said housing and extendable from said housing to an extended position over said roof; and,
    (c) a first pair of support stands positionable on said roof in a forward position for holding said canopy away from said roof when said canopy is extended over said roof, and a first strap extendable through said first pair of support stands for strapping said first pair of support stands to said roof in said forward position; and,
    (d) a second pair of support stands positionable on said roof in a rearward position for holding said canopy away from said roof when said canopy is extended over said roof, and a second strap extendable through said second pair of support stands for strapping said second pair of support stands to said roof in said rearward position,
wherein each of said support stands comprises a canopy hook for releasably engaging said canopy when said canopy is extended over said roof, and wherein said canopy includes a first plurality of openings spaced along a first side region of said canopy and a second plurality of openings spaced along a second side region of said canopy, each of said canopy hooks being engageable with a selected one of said openings.

2. Apparatus as defined in claim 1, wherein said canopy hooks are moveable from an unlatched position facilitating engagement and disengagement with said canopy and a latched position securing said canopy.

3. Apparatus as defined in claim 1, wherein each of said straps has opposed ends releasably couplable with each other and a length sufficient to form a continuous loop which extends above said roof between opposed sides of said vehicle then below said roof through window openings resulting when said windows are rolled down.

4. Apparatus as defined in claim 1, wherein:
  (a) said housing is mountable within said trunk;
  (b) said canopy includes an opening permitting passage of said trunk latch through the canopy when said trunk is closed and said canopy is extended outwardly from said trunk and over said roof; and,
  (c) said apparatus further includes:
    (i) a plurality of elastic ropes, each secured at one end to a forward end of said canopy; and,
    (ii) a corresponding plurality of body hooks, each secured to an opposed end of an associated one of said ropes, and each engageable with said vehicle body.

5. Apparatus as defined in claim 4, wherein said canopy hooks are moveable from an unlatched position facilitating engagement and disengagement with said canopy and a latched position securing said canopy.

6. Apparatus as defined in claim 1, wherein each of said support stands further comprises:
  (a) a stand housing comprising a housing base, a containment wall, and a cap together defining a containment region, said canopy hook associated with the stand including a stem extending upwardly from the containment region from a base of said hook through an opening in said cap;
  (b) a flange extending outwardly from said stem; and,
  (c) a spring contained within said housing, said base of said hook being carried by an upper end of said spring, said hook being moveable upwardly and downwardly between:
    (i) an upper position where both said stem and said flange extend upwardly through said opening in said cap, and where rotation of said canopy hook relative to said support stand is restrained by engagement between said flange and said cap; and,
    (ii) a lower position where said flange is fully contained within said containment region, said hook then being rotatable relative to said stand to an angular position where upward movement of said canopy hook is restrained by engagement between said flange and said cap.

7. Apparatus as defined in claim 6, wherein said housing base of each support stand includes an opening sized to receiving one of said straps through the opening.

* * * * *